United States Patent
Dusserre-Telmon et al.

(10) Patent No.: US 6,872,003 B2
(45) Date of Patent: Mar. 29, 2005

(54) OIL-DAMPED ROLLING BEARING

(75) Inventors: Guy Dusserre-Telmon, Sivry-Courtry (FR); Daniel Plona, Vulaines sur Seine (FR)

(73) Assignee: SNECMA Moteurs, Paris (FR)

( * ) Notice: Subject to any disclaimer, the term of this patent is extended or adjusted under 35 U.S.C. 154(b) by 15 days.

(21) Appl. No.: 10/671,742

(22) Filed: Sep. 29, 2003

(65) Prior Publication Data

US 2004/0062460 A1 Apr. 1, 2004

(30) Foreign Application Priority Data

Oct. 1, 2002 (FR) .............................................. 02 12107

(51) Int. Cl.[7] .............................................. F16C 27/00
(52) U.S. Cl. ...................................................... 384/99
(58) Field of Search ........................ 384/99, 474, 475, 384/537, 584

(56) References Cited

U.S. PATENT DOCUMENTS

| | | |
|---|---|---|
| 4,479,682 A | 10/1984 | Olivier |
| 4,693,616 A | 9/1987 | Rohra et al. |
| 4,721,398 A | 1/1988 | Miyashita et al. |
| 5,749,660 A | 5/1998 | Dusserre-Telmon et al. |
| 6,261,003 B1 | 7/2001 | Dusserre-Telmon et al. |

FOREIGN PATENT DOCUMENTS

JP 2001-295610 10/2001

*Primary Examiner*—Lenard A Footland
(74) *Attorney, Agent, or Firm*—Oblon, Spivak, McClelland, Maier & Neustadt, P.C.

(57) ABSTRACT

A rolling bearing for a turbomachine supporting a first shaft to rotate relative to a second shaft, and comprising: a plurality of rolling elements engaged between an inner annular ring mounted on the second shaft and an outer annular ring mounted on the first shaft; an oil film formed at an annular contact surface between said outer ring and said first shaft; at least one duct passing through said inner ring and opening out in an inner race for said rolling elements in order to lubricate them; and at least one additional duct passing through said inner ring and opening out outside the inner race in order to feed oil through said outer ring to said oil film under the effect of the centrifugal force generated by said second shaft rotating, said outer ring having an annular shoulder projecting radially towards the inside of said annular space, said shoulder having at least one channel opening out substantially in register with said additional duct and opening out into said oil film.

6 Claims, 2 Drawing Sheets

OIL-DAMPED ROLLING BEARING

BACKGROUND OF THE INVENTION

The present invention relates to a rolling bearing provided with a film of oil under pressure of the "squeeze film" type and intended for use, in particular, in the field of aviation.

Rolling bearings are commonly used in the field of aviation. An aviation turbomachine has rolling bearings for rotatably supporting a first shaft relative to a second shaft that is coaxial with the first. For example, such bearings may be disposed between the high pressure turbine shaft and the low pressure turbine shaft of the turbomachine. Such bearings are essentially constituted by balls or rollers retained in races formed by outer and inner rings. In a turbomachine, ball bearings are generally used for retaining axial loads and roller bearings for retaining radial loads.

In order to obtain satisfactory operation of rolling bearings of this type, it is necessary to ensure firstly that the bearings are lubricated and cooled, and secondly that vibration of the shafts and the bearings is damped.

In conventional manner, bearings are lubricated and cooled by injecting oil between the rings of the bearing. More precisely, oil is delivered between the bearing rings from an oil feed circuit connected to one or more orifices pierced in the inner ring of the bearing. The oil is then delivered or centrifuged towards the outside of the bearing, taking away the heat produced by the bearing by transfer of heat. In addition, in order to reduce the vibration generated by the high speed of rotation of the shafts of the turbomachine that are supported by said bearings, the oil under pressure is also confined between the outer ring and a structural part of the bearing via the same feed circuit. The oil under pressure is thus present in the form of a thin film at the contact surface between the outer ring and the structural part of the bearing, and it serves to act as a vibration damper. Two annular sealing rings interposed between the outer ring and the structural part of the bearing define the size of this oil film.

A problem of feeding the vibration-damping film with high pressure oil then arises in a rolling bearing disposed between two rotary shafts, for example between the low pressure turbine shaft and the high pressure turbine shaft of a turbomachine. Under such circumstances, it is difficult to feed the oil film in satisfactory manner via a conventional feed circuit. In particular, it turns out to be difficult to provide the shaft in question with a feed circuit that includes recovery scoops, feed ducts, and a pump.

U.S. Pat. No. 4,693,616 proposes a solution to this problem, which solution consists in using the pressure generated by centrifuging the lubricating oil of the bearing in order to feed the damping oil film. For this purpose, an orifice is pierced through the outer ring to open out into the contact surface between the outer ring and the structural part of the bearing. Under the effect of the centrifugal force generated by the shafts rotating, the oil injected between the rings of the bearing then penetrates via said orifice into the space that lies between the outer ring and the structural part so as to form the oil film.

However, the solution described in that patent does not enable pressures to be generated in the oil film that are sufficiently high, thereby leading to problems of filling and encouraging cavitation phenomena within the oil film. Such problems have the effect of reducing the efficiency of the turbines of the turbomachine.

OBJECT AND SUMMARY OF THE INVENTION

The present invention thus provides a rolling bearing for a turbomachine of structure that enables the bearing to be lubricated and cooled, and that also enables vibration to be damped by an oil film, by generating pressures that are high enough to mitigate the drawbacks of the prior art.

To this end, the invention provides a rolling bearing for a turbomachine to support a first shaft rotatably relative to a second shaft, and comprising: a plurality of rolling elements engaged between an inner annular ring mounted on the second shaft and an outer annular ring mounted on the first shaft, an inside face of the outer ring and an outside face of the inner ring defining between them an annular space; an oil film formed on an annular contact surface between the outer ring and the first shaft and defined laterally by at least two annular sealing rings; at least one duct passing through the inner ring, the duct communicating with an oil feed circuit and opening out into an inner race for the rolling elements in order to lubricate them; and at least one additional duct passing through the inner ring, the additional duct communicating with the oil feed circuit and opening out to the outside of the inner race in order to feed oil through the outer ring to the oil film under the effect of the centrifugal force generated by the rotation of the second shaft; wherein the outer ring includes an annular shoulder projecting radially towards the inside of the annular space, the shoulder including at least one channel opening out substantially in register with the additional duct and opening out into the oil film.

The presence of a channel formed in a shoulder of the outer ring makes it possible to generate high pressures within the oil film and thus to improve filling thereof and to limit cavitation phenomena. Preferably, the annular shoulder presents radial height that is at least twice the radial height of the outer annular ring.

The oil feed circuit includes at least one cavity formed in the second shaft in an annular contact surface with the inner ring, the cavity being fed with oil from an injection nozzle and the duct opening out into the cavity. In addition, the oil feed circuit further comprises an additional cavity formed in the second shaft in its annular contact surface with the inner ring, the additional cavity being fed with oil from the cavity with which it communicates, and the additional duct opening out into the additional cavity.

Advantageously, the channel of the annular shoulder opens out into the oil film via a homogenizing groove formed in the outer ring in its annular contact surface with the first shaft.

BRIEF DESCRIPTION OF THE DRAWINGS

Other characteristics and advantages of the present invention appear from the following description given with reference to the accompanying drawings which show an embodiment having low limiting character, and in which.

DETAILED DESCRIPTION OF AN EMBODIMENT

Figure 1:
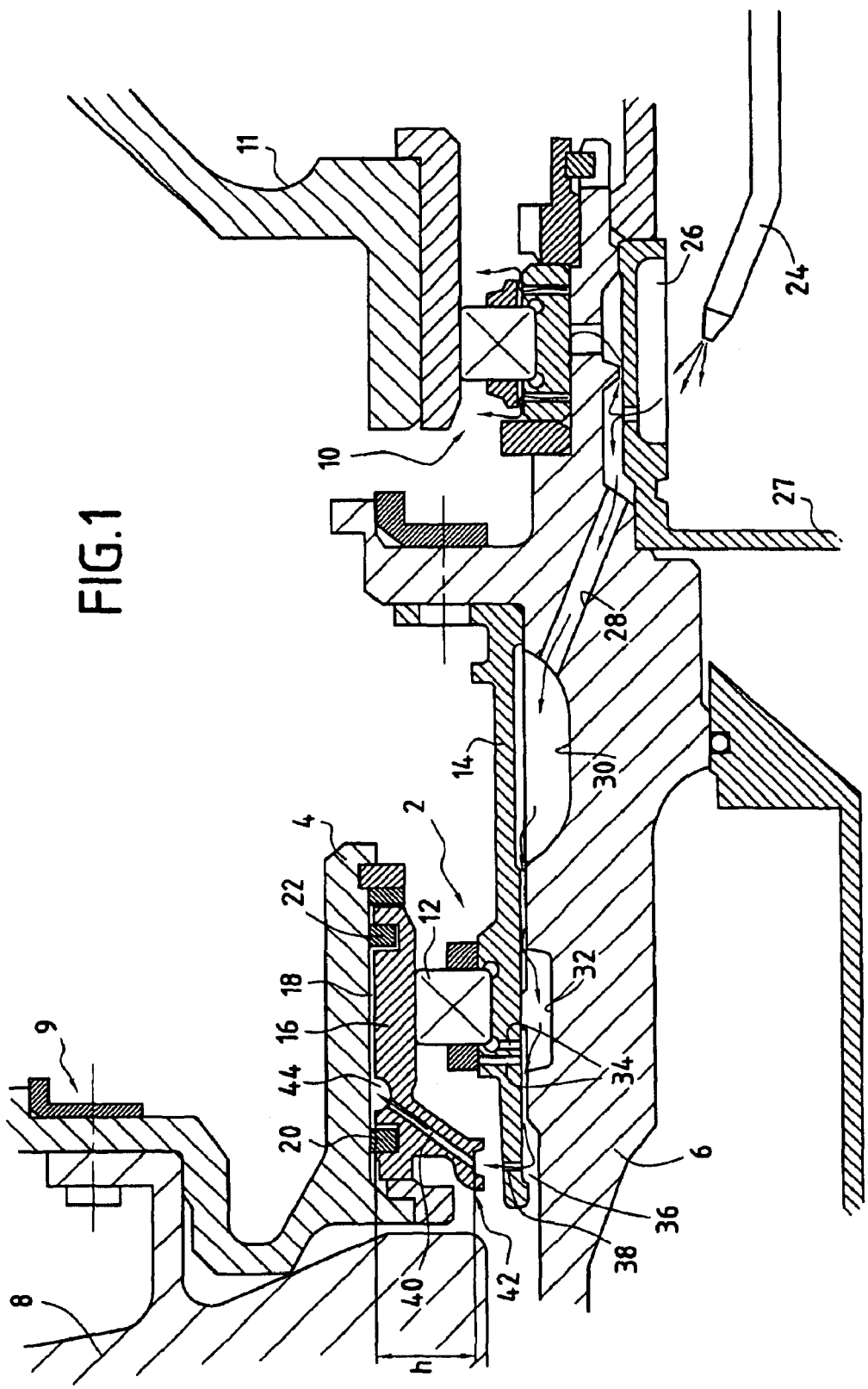
FIG. 1 is a diagrammatic longitudinal section view of the portion of a turbomachine that includes a rolling bearing of the invention.

FIG. 1 shows a portion of a turbomachine in longitudinal section, said portion including a rolling bearing constituting a preferred embodiment of the invention.

The bearing 2 is disposed between a first shaft 4 which is the trunion of the shaft line of the high pressure spool of the turbomachine, and a second shaft 6 which is the trunion of the shaft line of the low pressure spool. The first shaft 4 is secured to the high pressure turbine 8 of the turbomachine via a fastening 9. Another rolling bearing 10 is also shown in FIG. 1. This bearing supports the second shaft 6 to rotate relative to a casing 11 of the turbomachine and does not form part of the present invention, so it is therefore not described in greater detail.

The bearing 2 is constituted by a plurality of rollers 12 engaged between the inside faces of an inner annular ring 14 and of an outer annular ring 16 forming races. The inner ring 14 is mounted on the second shaft 6. Similarly, the first shaft 4 is mechanically secured to an outside face of the outer ring 16.

In order to damp the forces transmitted from the second shaft 6 to the first shaft 4, the bearing is provided with an oil film 18. This vibration-damping oil film is formed at the annular contact surface between the first shaft 4 and the outside face of the outer bearing 16. It is defined laterally by two sealing rings 20 and 22 placed in respective grooves machined in the outer ring in its surface that contacts the first shaft 4.

The oil required for lubricating and cooling the rollers 12 is delivered by a nozzle 24 injecting the oil into a circulation circuit. This oil circulation circuit has a collector groove 26 formed in a wall 27 of an oil manifold. This groove enables lubricating oil to be fed to both of the bearings 2 and 10 shown in FIG. 1. Concerning the bearing 2 constituting the subject matter of the present invention, a passage 28 connected to the first collector groove 26 is formed in the second shaft 6 and opens out into a first cavity 30 formed in the second shaft in its annular contact surface with the inner ring 14. This first cavity 30 communicates further downstream in the oil flow direction with a second cavity 32 likewise formed in the second shaft in its annular contact surface with the inner ring. One or more feed ducts 34 pass through the inner ring 14 of the bearing and open out into the second cavity 32 and also into the inner race for the rollers 12. These ducts (two of which can be seen in FIG. 1) thus enable the rollers of the bearing 2 to be fed with lubricating and cooling oil.

A third open cavity 36 may also be provided for admitting oil, from which the oil is taken to the oil film 18. This third cavity 36 is disposed downstream from the second cavity 32 in the oil flow direction in the annular contact surface between the second shaft 6 and the inner ring 14. An additional duct 38 passing through the inner ring opens out into this third cavity 36 and into the outside of the inner race for the rollers 12. In FIG. 1, only a single additional duct 38 is shown. It is also possible to imagine other passages through the inner ring for conveying oil to the oil film.

In accordance with the invention, the outer ring 16 of the bearing has at least one channel 40 for feeding the film 18 with oil. This channel passes through the outer ring 16, opening out substantially in register with the additional duct 38 formed in the inner ring and opening out between the two sealing rings 20 and 22 in the annular contact surface between the outer ring and the first shaft 4. More precisely, at its end facing the additional duct 38, the outer ring 16 presents an annular shoulder 42 projecting radially towards the annular space defined between the two rings of the bearing. The shoulder 42 is of sufficient radial height to allow the feed channel 40 formed in this shoulder to open out in register with the additional duct 38. For given speed of rotation of the second shaft, the pressure generated in the film varies as a function of the distance between the additional duct and the upstream end of the channel. Thus, in order to generate pressures in the oil film that are suitably high when the turbomachine is operating at less than full speed, i.e. a pressure of about 6 bars compared with 2 bars for a prior art damped bearing, the head height h (defined by the radial height of the shoulder 42) is advantageously at least twice and preferably three times greater than the head height of a prior art damped bearing (defined by the radial height of the outer ring of the bearing).

According to an advantageous characteristic of the invention, the feed channel 40 opens out into the oil film via a homogenizing groove 44 that is formed in the outer ring in its annular contact surface with the first shaft so as to make it easier to distribute oil throughout the annular space defined by the two sealing rings 20 and 22.

There follows a description of how a bearing of the invention operates, and more particularly of how the oil for lubricating and cooling the rollers and for feeding the oil film circulates.

The oil is injected by the nozzle 24 into the collector groove 26. Thereafter it passes through the passage 28 formed in the second shaft 6 prior to penetrating into the first cavity 30 and then into the second cavity 32. At this location, the oil is shared between two separate circuits:

firstly by the effect of the centrifugal force generated by the rotation of the second shaft, the oil passes through the inner ring 14 via the duct(s) 34 so as to cool and lubricate the rollers 12; and secondly the oil penetrates into the third cavity 36, passes through the inner ring via the additional duct 38, and still under the centrifugal effect, penetrates into the feed channel 40 formed in the shoulder 42 of the outer ring so as to feed the oil film 18 that serves to damp vibration with oil under pressure.

Figure 2:
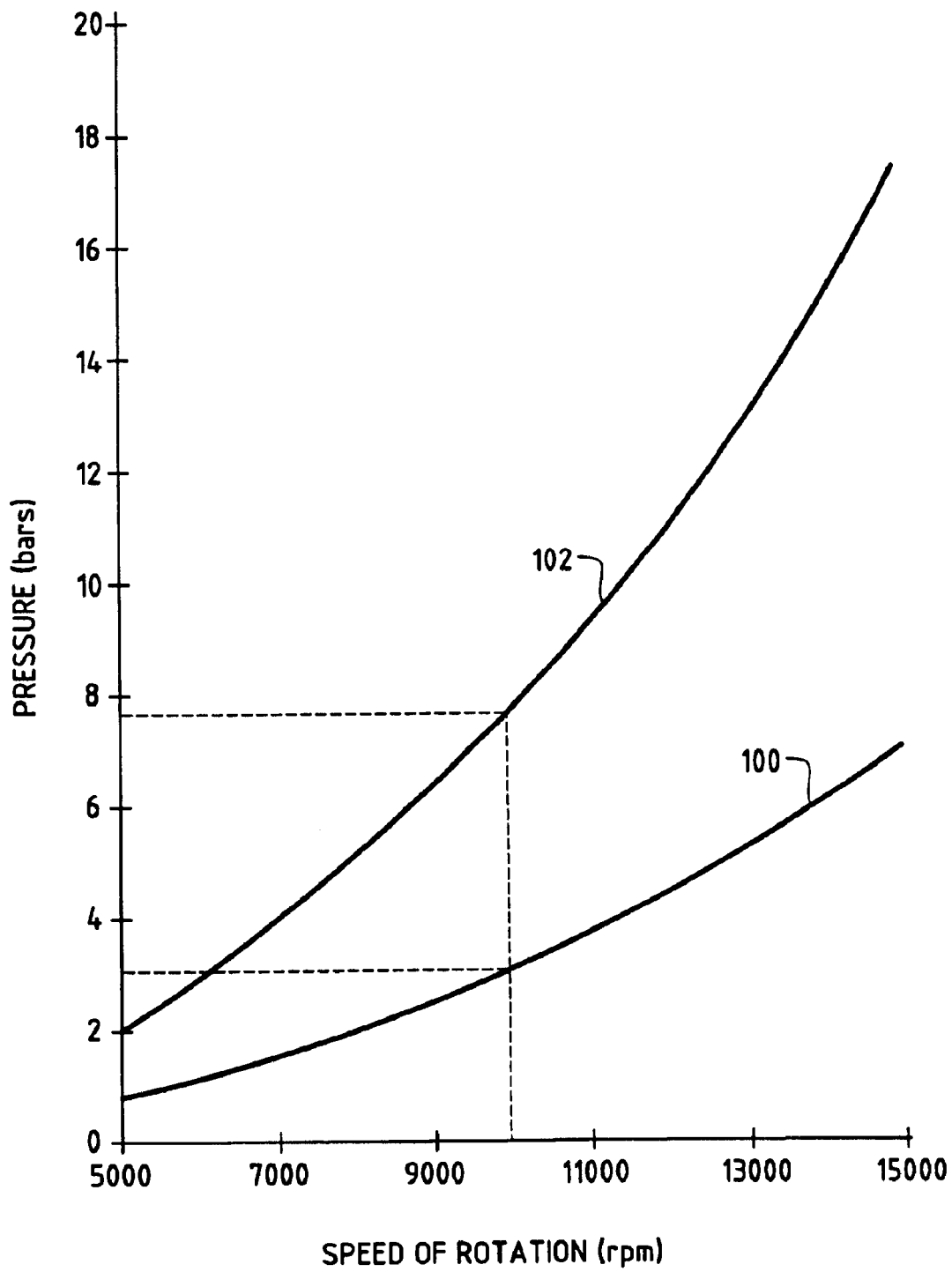
FIG. 2 is a graph plotting two curves of pressure as a function of speed, one for a prior art bearing and the other for a bearing of the invention.

The presence of the shoulder 42 on the outer ring projecting radially towards the annular space defined between the two rings of the bearing makes it possible to obtain pressure within the oil film 18 that is considerably greater than that obtained by a prior art damped rolling bearing. FIG. 2 shows this considerable difference clearly. In the figure, curves 100 and 102 represent the pressure of the oil generated within the oil film as a function of the speed of rotation of the second shaft (corresponding to the trunion of the shaft line of the low pressure spool of the turbomachine), respectively for a prior art bearing and for a bearing of the invention. Thus, when the second shaft is rotating at a speed of about 10,000 revolutions per minute (rpm), for example, a conventional bearing enables a pressure of about 3 bars to be obtained in the oil film, whereas at the same speed, the bearing of the present invention generates a pressure of nearly 8 bars. Such a pressure in the oil film limits cavitation phenomena and thus makes it possible to obtain vibration damping that is much more effective than with a conventional damped bearing.

What is claimed is:

1. A rolling bearing for a turbomachine to support a first shaft rotatably relative to a second shaft, and comprising:

a plurality of rolling elements engaged between an inner annular ring mounted on the second shaft and an outer annular ring mounted on the first shaft, an inside face of said outer ring and an outside face of said inner ring defining between them an annular space;

an oil film formed on an annular contact surface between said outer ring and said first shaft and defined laterally by at least two annular sealing rings;

at least one duct passing through said inner ring, said duct communicating with an oil feed circuit and opening out into an inner race for said rolling elements in order to lubricate them; and at least one additional duct passing through said inner ring, said additional duct communicating with said oil feed circuit and opening out to the outside of the inner race in order to feed oil through said outer ring to said oil film under the effect of the centrifugal force generated by the rotation of said second shaft;

wherein said outer ring includes an annular shoulder projecting radially towards the inside of said annular space, said shoulder including at least one channel opening out substantially in register with said additional duct and opening out into said oil film.

2. A bearing according to claim 1, wherein said annular shoulder presents radial height that is at least twice the radial height of said outer annular ring.

3. A bearing according to claim 1, wherein the oil feed circuit includes at least one cavity formed in the second shaft in an annular contact surface with the inner ring, said at least one cavity being fed with oil from an injection nozzle and said at least one duct opening out into said at least one cavity.

4. A bearing according to claim 3, wherein said oil feed circuit further comprises an additional cavity formed in the second shaft in its annular contact surface with the inner ring, said additional cavity being fed with oil from said at least one cavity with which it communicates, and said at least one additional duct opening out into said at least one additional cavity.

5. A bearing according to claim 1, wherein said at least one channel of the annular shoulder opens out into the oil film via a homogenizing groove formed in the outer ring in its annular contact surface with the first shaft.

6. A bearing according to claim 1, wherein the first shaft is a trunion of the shaft line of the high pressure spool of the turbomachine, and the second shaft is a trunion of the shaft line of the low pressure spool of the turbomachine, the rolling elements being rollers.

* * * * *